(12) United States Patent
Anderson et al.

(10) Patent No.: US 7,188,173 B2
(45) Date of Patent: Mar. 6, 2007

(54) METHOD AND APPARATUS TO ENABLE EFFICIENT PROCESSING AND TRANSMISSION OF NETWORK COMMUNICATIONS

(75) Inventors: Andrew V. Anderson, Hillsboro, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 821 days.

(21) Appl. No.: 10/262,351

(22) Filed: Sep. 30, 2002

(65) Prior Publication Data

US 2004/0064537 A1    Apr. 1, 2004

(51) Int. Cl.
*G06F 15/16* (2006.01)
(52) U.S. Cl. .................. 709/225; 709/229; 709/223; 726/12
(58) Field of Classification Search .......... 709/223, 709/247, 225, 229; 726/12
See application file for complete search history.

(56) References Cited

U.S. PATENT DOCUMENTS

| | | | |
|---|---|---|---|
| 2002/0169954 A1* | 11/2002 | Bandini et al. ............. | 713/153 |
| 2003/0033435 A1* | 2/2003 | Hanner ........................ | 709/247 |
| 2003/0046388 A1* | 3/2003 | Milliken ...................... | 709/224 |

OTHER PUBLICATIONS

Curtin, Matt; Introduction to Network Security; Reprinted with the permission of Kent Information Services, Inc.; Mar. 1997; 16 pgs.
Eastwin, Kendren; Internet Security; California State University, Fullerton, CA; http://xena.fullerton.edu/~eastwink/;Nov. 26, 2000; 12 pgs.
Bidirectional Peer-to Peer Communication with Interposing Firewalls and NATs; Revision 0.095; The Peer-toPeer Working Group; Aug. 17, 2001; 37 pgs.
Cryptographic hash; http://www.atis.org/tg2k/_cryptographic_hash.html; Jan. 9, 2003; 1 pg.
KnowledgeShare—White Papers / Firewall Q&A: http://www.vicomsoft.com/knowledge/reference/firewalls1.html; Jan. 9, 2003; 9pgs.
An Overview/Hash Function; What is a Hash Function; http://www.hack.gr/users/dij/crypto/overview/hash.html; Jan. 9, 2003; 3 pgs.

* cited by examiner

*Primary Examiner*—Rupal Dharia
*Assistant Examiner*—Djenane Bayard
(74) *Attorney, Agent, or Firm*—Blakely, Sokoloff, Taylor & Zafman LLP (57) ABSTRACT

A method and apparatus to enable efficient processing and transmission of network communications are described. A network transmission directed to one or more destination nodes within a network is received. One or more network transmission items are identified in the network transmission. One or more item signatures associated with the one or more network transmission items are generated. Finally, a determination is made whether the one or more network transmission items can be transmitted to the one or more destination nodes by further processing the one or more item signatures.

16 Claims, 5 Drawing Sheets

METHOD AND APPARATUS TO ENABLE EFFICIENT PROCESSING AND TRANSMISSION OF NETWORK COMMUNICATIONS

FIELD OF THE INVENTION

The present invention relates generally to computer/communication network management and, more particularly, to a method and apparatus to enable efficient processing and transmission of network communications.

BACKGROUND

Communication network gateway devices, such as network firewalls, govern the passage of information in and out of a given network or individual network nodes, such as a personal computer.

Presently, various types of network firewalls exist to prevent unauthorized communications from entering or leaving the network. Such communications are exchanged, for example, between internal nodes within the network and external nodes outside of the network. These network firewalls filter information based on address information, for example an Internet Protocol (IP) address and respective port, communication protocol, for example a User Datagram Protocol (UDP) or a Transmission Control Protocol (TCP), or application protocol, wherein the state of an application is monitored to ensure that the application is requesting a communication channel in accordance with expected behavior.

Other tools that govern network communications include content filtering and virus detection tools.

Content filtering tools are typically employed to permit or prevent access to code, control, data, mobile code, application state, service state, machine state (including virtual machines), or other services (herein referred to as "information" or "content"). For example, content filtering can be used to permit or deny access to information, such as proprietary materials (e.g. company secrets), licensed content (e.g. movies or applications), or obscene or other objectionable material. Such filtering tools govern access to information based on content headers (e.g. magic numbers denoting file types), content signatures (e.g. cryptographic hashes over some portion of, or possibly the entire, payload), payload type, network addresses, keyword searches and pattern matching, or rating information provided by the author of the material or by a review board.

Virus detection tools are also used to filter network communications, often at network gateway choke points, to prevent the reception, infection, or transmission of malicious information (e.g. code or data) such as worms, viruses, Trojan horses, etc, between networks or network entities. In the context of communication networks, virus detection tools scan payloads searching attachments or files for virus code. Typically these searches are for specific strings, or code segments identified by a master database.

Also in existence are services such as program execution and authentication control. For example, a computer wishing to launch an executable sequence must send a communication to a service on the network in order to determine if the user has permissions to execute the program or, for example, to determine if the program has been illegally or maliciously tampered with. The service determines if the program can execute or not. These and other prior methods either rely on a predetermined/pre-identified list or database to identify content (or classes of information), or only apply to specific information types requiring special payload structures, encodings, or packaging (e.g. digital rights management solutions).

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a method and apparatus to enable efficient processing and transmission of network communications are described.

In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A network is a system of nodes connected by communication links. A node within the network may contain one or more logical devices. Devices may serve one or more roles such as being producers/providers or consumers/users of computation, storage, information and services, as well as providing or facilitating network processing and communication governance. Such devices may include, but are not limited to, super computers, mainframes, servers, workstations, desktop computers, Personal Digital Assistants (PDAs) and other hand-held computing or storage devices, gateway devices, cell phones, virtual machines, sensor nodes, software-implemented entities (e.g. web services), network-enabled services and devices, and networking fabric such as hubs, switches, routers, firewalls, etc. A node is any entity that receives or transmits information on the network, without regard for the physical medium (e.g. wired medium or wireless medium).

Communication networks, which include computer networks, often use protocol layers to facilitate communication between nodes. For example, most computer networks, such as, for example, the Internet, operate using the standard Open Systems Interconnection (OSI) model. The OSI has a layered architecture currently comprising physical (e.g. bits), data link (e.g. frames), network (e.g. packets), transport (e.g. connection-oriented paths), session (e.g. session messages), presentation (e.g. high-level messages), and application (e.g. message and user data) layers.

Communications between two or more nodes (e.g. computers, network devices, sensors, etc) on a network, regardless of protocol stack level, may be facilitated by, or may pass through, multiple devices including, but not limited to, computers (e.g. proxy servers) and network devices (e.g. switches, routers, firewalls, etc), and are herein called "network communications."

During a network communication, the network transmits information from a source node to a destination node. Alternatively, a source node may multicast or broadcast to a set of destination nodes. Entities transmitted during a network communication may include, but are not limited to, all of or portions of articles and other content, such as files, documents, sensor readings, multimedia (e.g. music, video, images, voice), databases, compound articles (e.g. XML), archives, hierarchical articles, compressed articles, HTML web pages, encrypted articles, user identities, passwords, transactions, electronic money transfers, facsimiles, and architectural designs.

Such network transmissions include one or more "network transmission items." Network transmission items may be selected from one network protocol layer or from multiple layers. Moreover, network transmission items may consist of multiple, but not necessarily contiguous, elements of the transmission. Similarly, network transmission items may also include portions of the data payloads, which also may further include compound or hierarchical articles.

For example, a network transmission item could encompass: the full data payload, the first 100 bytes of the data payload, every $3^{rd}$ bit of the data payload, the source and destination node IP addresses and ports, protocol headers, protocol fields, subsets or portions of such elements (e.g. payloads, protocol fields, etc), IP packets, user identity, user permissions, application state, or other protocol and external metadata. Alternatively, a network transmission item might include one or more of the above listed elements or none at all. Network transmission items include any subset, including the null set and the entirety, of a network transmission. A device, for example, may fail to recognize a network transmission item or may recognize that the transmission should be processed in the same manner as an unrecognized transmission item.

Although network transmission items can include any element of any protocol that constitutes the network transmission, within the scope of the OSI model, the description will address elements at the network layer (e.g. Internet Protocol (IP) packets), transport layer (e.g. TCP) and higher layers, such as the application layer.

A network communication may pass through or traverse one or more intermediate network nodes when moving (i.e. being sent or routed) from the source node to the destination node. Alternatively, the network communication may be routed from the source node directly to the destination node. As a result, elements of the network communication, such as individual data packets, can take different routes when transmitted from the source node to the destination node.

Networks are organized into domains, also called realms, generally due to technical (e.g. IP address assignments from private address blocks or public address blocks and separation by shared network devices such as network gateway devices like routers) or policy realm (e.g. security, administrative) considerations. Network domains can vary in size from a single node to multiple nodes and are also hierarchical. The Internet, for instance, consists of many subdomains.

Given a specific network node, an "internal network" identifies the collection of nodes that operate within the same network domain as the specific network node. "Internal nodes" refer to nodes within the same internal network. "External nodes" refer to any network node outside of the internal network, i.e. a network node that is in a different network domain.

It is possible for a network node to operate within or across multiple network domains or policy realms concurrently. The particular designation of internal network node versus external network node is apparent by the usage context to those skilled in the art.

Some networks and network domains can be created over existing network topologies. Overlay networks, for example, may span, for certain types of functionality, multiple network domains. Examples of overlay networks include Groove Networks, Gnutella, and other known networks. Virtual private networks, for example, permit mobile or remote nodes to participate in an internal network domain by communicating in a secure manner, over external network infrastructure to the internal network. In addition, network nodes may move from one network to another over a period of time, such as, for example, in the case of mobile laptops, handheld devices, and cell phones. In any of these above cases, network nodes, however, are always subject to the policies of local physical (wired or wireless) network domain that they belong to.

Communications between internal nodes and external nodes must usually traverse a network "gateway device." The network gateway device relays potentially filtered or altered information from one network realm to another. The network gateway device may include, for example, software resident on a computer through which all network traffic to and from the computer passes. Similarly, a network gateway device may consist of one or several devices through which all computers on a private network communicate with the external world such as the Internet. Network gateway devices often comprise multiple networking services, monitoring and checking facilities, and administrative functions including, but not limited to: firewalls, network address translation, security and integrity checks, network traffic logging, network bandwidth shaping, proxy services, and other known functions.

Network gateway devices often include content filtering mechanisms whose purpose is to prevent unauthorized entry or exit of network traffic and information. These checks may include, for example, payload virus scans and security checks such as, for example, searching for proprietary information surreptitiously embedded into photographic images or movies using steganographic techniques. Such checks have numerous outcomes including the complete or partial passing of the transmission, or the denial of transmission.

Checks may also result in logging transmission information, alerts, human intervention, etc. It would be advantageous, therefore, to ensure that checks are only performed on network communications that require attention. Streamlining (optimizing) and, better yet, preventing unnecessary content checking improves overall system efficiency, cost and security.

In one embodiment, a device receives a network transmission being sent from a source node to a destination node. As the network transmission traverses the device, the device identifies one or more network transmission items within the network transmission. The device computes one or more item identifiers associated with the network transmission items. The device then accesses one or more databases using the item identifier to determine further actions.

In one embodiment, actions include, but are not limited to, one or more the following:

Admit (pass) the network transmission or network transmission items.

Deny (drop) the network transmission or network transmission items.

Further processing or rewriting of the network transmission (or network transmission items), which may include automated, computationally intensive inspection and analysis or tagging/alerts issued on items for human inspection and analysis.

Update stored metadata associated with a given item identifier.

Logging and statistics based on zero or more of the above activities.

It should be noted that one more item identifiers may be used to determine the outcome of the network transmission as a whole or some proper subsets of the network transmission (e.g. some smaller number of network transmission items).

In one embodiment, an item identifier is computed over the network transmission data payload and that item identifier is used to determine if the network transmission can be admitted (passed) or denied (dropped). For example, in this embodiment, actions may include: preventing company secret documents (item identifier known a priori) from being sent out of the corporate network; permitting a network-shippable home movie from uncle Ray to arrive (item identifier not known a priori) and later to be forwarded by the user to cousin Mary, but to pass through without the need for special attention or analysis; preventing email from a malicious worm (item identifier known a priori) from entering the corporate network.

In one embodiment, a restricted set of applications, protocols, or content/article/data types may be used. For example, a system administrator may wish to prevent users from receiving application binaries for deprecated uses. Or, for example, it may be required to prevent the transmission of pictures of employees (e.g. GIFs stored for identification badges) out of the internal network.

Figure 1:
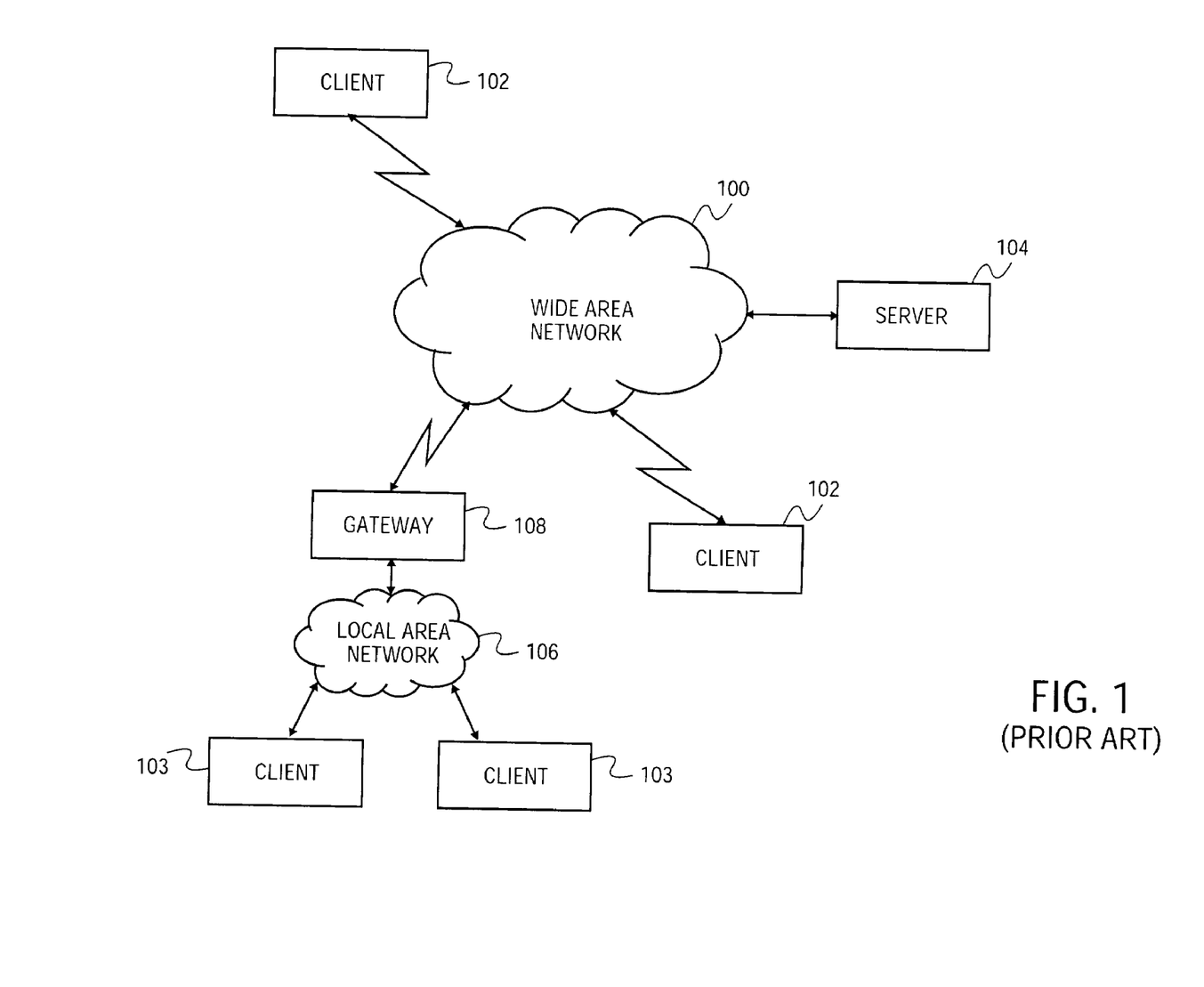
FIG. 1 is a block diagram of a conventional network infrastructure.

FIG. 1 is a block diagram of a conventional network infrastructure. Referring to FIG. 1, the block diagram illustrates a network environment in which the present invention operates. In this conventional network infrastructure, a server computer processing system 104 is coupled to a network 100, such as, for example, a wide-area network (WAN). Wide-area network 100 includes the Internet, or other proprietary networks, such as America Online™ or Microsoft Network™, each of which are well known to those of ordinary skill in the art. Wide-area network 100 may also include conventional network backbones, long-haul telephone lines, Internet service providers, various levels of network routers, and other conventional means for routing data between network devices.

Using conventional network protocols, server 104 may communicate through the wide-area network 100 to a plurality of client computer processing systems 102, connected to the wide-area network 100 in various ways or directly connected to server 104. For example, as shown in the embodiment of FIG. 1, client 102 is connected directly to the wide-area network 100 through a digital broadband connection, or a direct or dial-up telephone connection or other network transmission line.

In another alternate network topology, wide-area network, or external network, 100 may communicate with a local area network, or internal network, 106 through a network gateway device 108. The gateway device 108 is used to route data to clients 103 through the local area network 106. Clients 103 may communicate with each other through the local area network 106, or with server 104 through the gateway device 108 and the wide-area network 100. In another alternate embodiment (not shown), the server 104 and the clients 103 may be connected to each other through the local area network 106, and not through the wide area network 100. In addition, although the local area network 106 is defined by the network gateway device 108, two clients 103 within the local area network 106 may be separated by another gateway device (not shown) such as, for example, a router, or a Network Address Translation (NAT) device.

Using one of a variety of network connection devices, server computer 104 can communicate data directly with clients 102 or 103. In a particular implementation of this network configuration, a server computer 104 may operate as a web server if the Internet is used as wide-area network 100. Using the Hyper Text Transfer Protocol (HTTP) and the Hyper Text Markup Language (HTML) across a network, web server 104 may communicate across the Web with clients 102 or 103. In this configuration, a client 102 or 103 uses a client application program known as a web browser, such as the Netscape Navigator™ browser, published by America Online™, the Internet Explorer™ browser, published by Microsoft Corporation of Redmond, Wash., the user interface of America Online™, or the web browser or HTML translator of any other conventional supplier. Using such conventional browsers and the Web, the client 102 or 103 may access graphical and textual data or video, audio, or tactile data provided by server 104. Conventional means exist by which the client 102 or 103 may supply information to web server 104 through the network 100 and the web server 104 may return processed data to the client 102 or 103.

Figure 2:
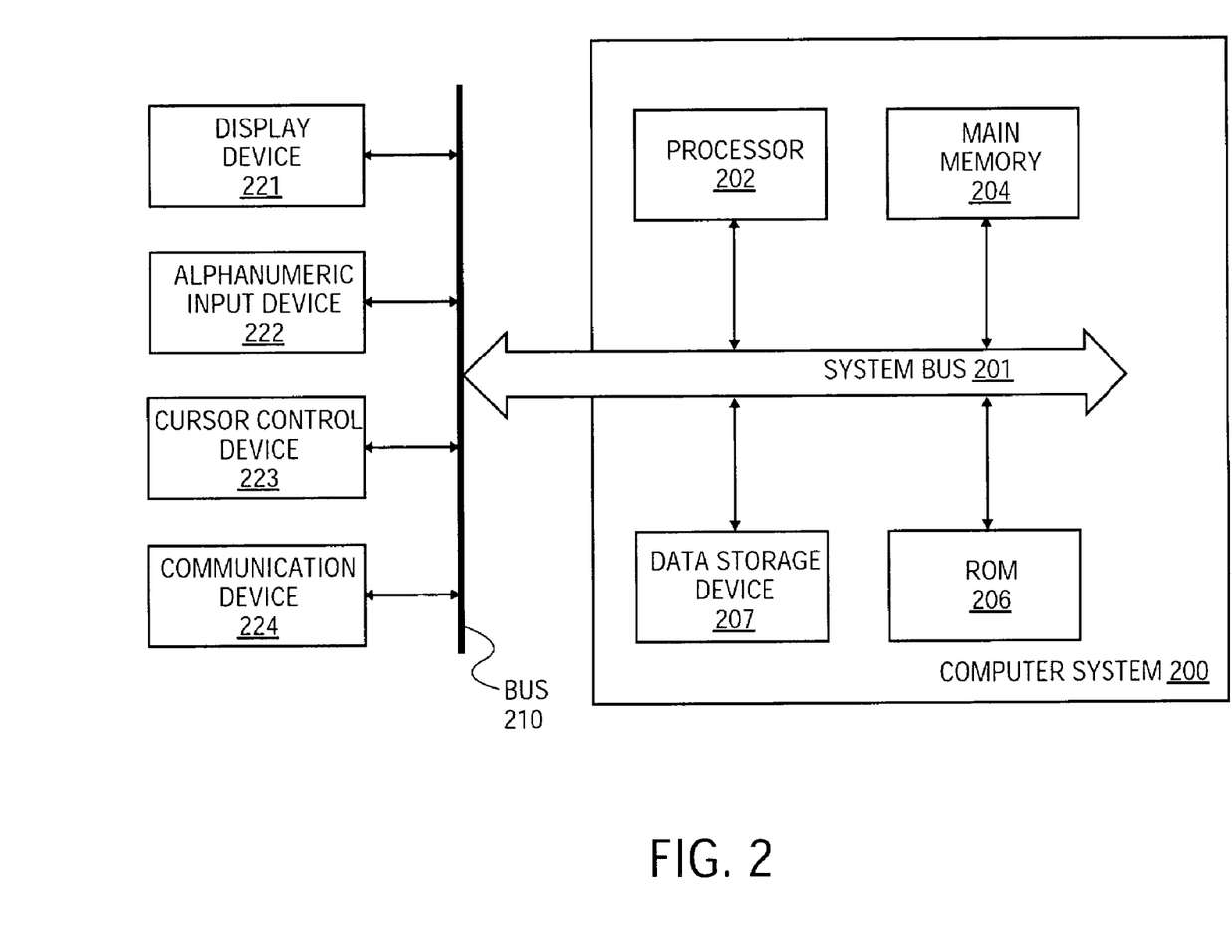
FIG. 2 is a block diagram of one embodiment of a processing system.

Having briefly described one embodiment of the network environment in which the present invention operates, FIG. 2 shows one embodiment of a computer processing system, which illustrates an exemplary client 102, 103, server 104, or gateway device 108 system in which the features of the present invention may be implemented.

In one embodiment of the invention, the processing system 200 includes a system bus 201, or other communications module similar to the system bus, for communicating information, and a processing module, such as processor 202, coupled to bus 201 for processing information. Processing system 200 further includes a main memory 204, such as a random access memory (RAM) or other dynamic storage device, coupled to bus 201, for storing information and instructions to be executed by processor 202. Main memory 204 may also be used for storing temporary variables or other intermediate information during execution of instructions by processor 202.

Processing system 200 also comprises a read only memory (ROM) 206, and/or other similar static storage device, coupled to bus 201, for storing static information and instructions for processor 202.

An optional data storage device 207, such as a magnetic disk or optical disk, and its corresponding drive, may also be coupled to the processing system 200 for storing information and instructions. System bus 201 is coupled to an external bus 210, which connects the processing system 200 to other devices. In one embodiment, processing system 200 can be coupled via bus 210 to a display device 221, such as a cathode ray tube (CRT) or a liquid crystal display (LCD), for displaying information to a computer user. For example, graphical or textual information may be presented to the user on display device 221. Typically, an alphanumeric input device 222, such as a keyboard including alphanumeric and other keys, is coupled to bus 210 for communicating information and/or command selections to processor 202. Another type of user input device is cursor control device 223, such as a conventional mouse, touch mouse, trackball, or other type of cursor direction keys, for communicating direction information and command selection to processor 202 and for controlling cursor movement on display 221. In one embodiment, processing system 200 may optionally include video, camera, speakers, microphones, sound card, and many other similar conventional options and transducers.

A communication device 224 is also coupled to bus 210 for accessing remote computers or servers, such as server 104, or other servers via the Internet, for example. The communication device 224 may include a modem, a network interface card, or other well-known interface devices, such as those used for interfacing with Ethernet, Token-ring, or other types of networks. In any event, in this manner, the processing system 200 may be coupled to a number of servers 104 via a conventional network infrastructure such as the infrastructure illustrated in FIG. 1 and described above.

Figure 3:
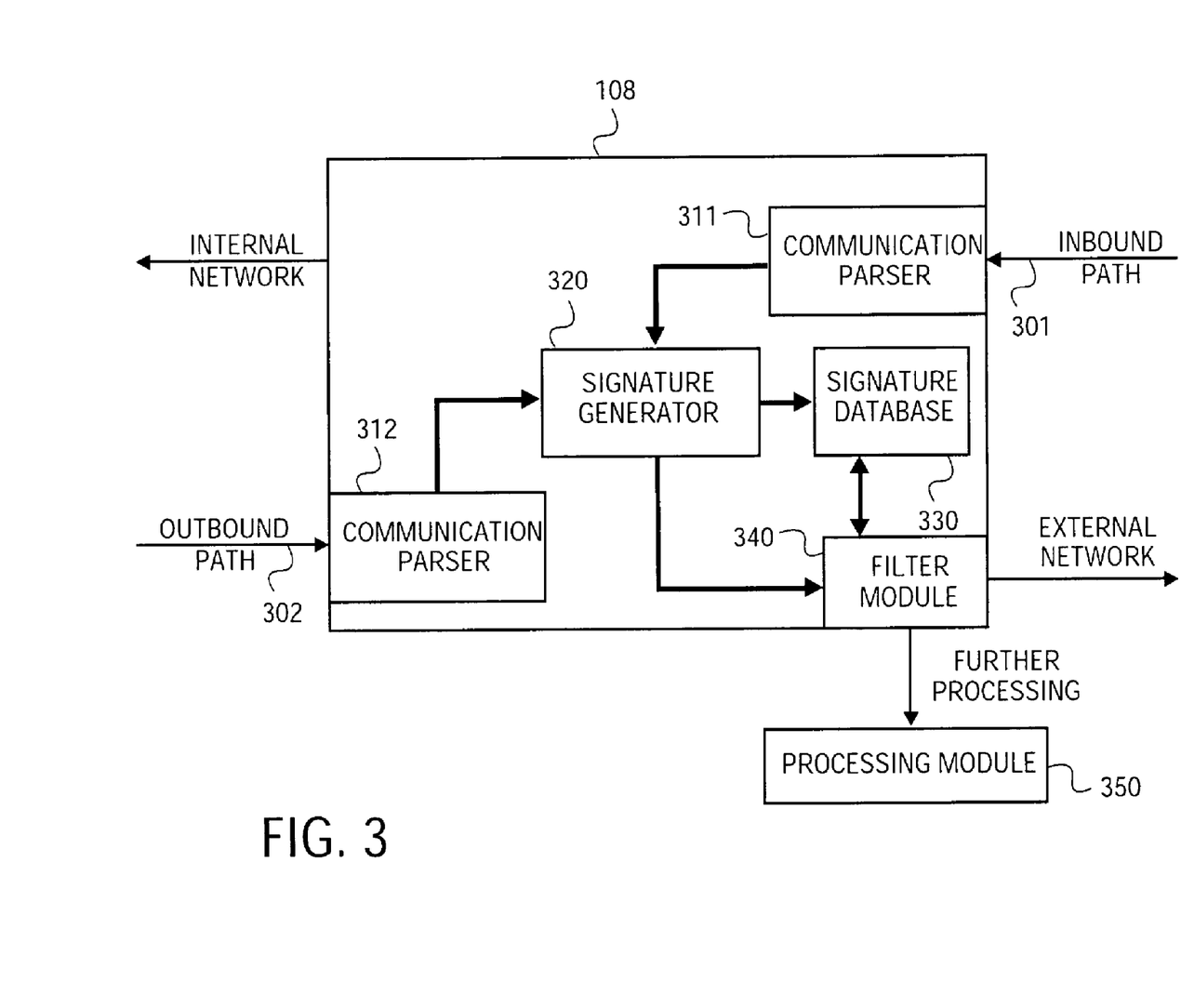
FIG. 3 is a block diagram of one embodiment of an apparatus to enable efficient processing and transmission of network communications.

FIG. 3 is a block diagram of one embodiment of an apparatus to enable the efficient processing and transmission of network communications, such as one embodiment of the network gateway device 108 of FIG. 1. As illustrated in FIG. 3, in one embodiment, network gateway device 108 receives information, such as, for example, packets containing data, from an external source node within an external network, such as, for example, a client 102 or server 104 within wide area network (WAN) 100. The information is transmitted during a network communication between the external source node 102 or 104 and an internal destination node, such as, for example a client 103 within the local area network (LAN) 106.

The gateway device 108 receives the network transmission along an inbound path 301 and routes the transmission to the internal destination node such as client 103 within LAN 106. Alternatively, the gateway device 108 may receive a network transmission from an internal source node within LAN 106 along an outbound path 302 and may transmit the information to an external destination node within WAN 100. It is to be understood that the inbound path, outbound path, internal and external networks are logical designations. In one embodiment, the inbound and outbound paths share the same physical medium (e.g. a CAT-5 cable). In alternate embodiments, the internal and external networks may be the same physical network distinguished by policy access or usage policy enforcement devices (e.g. a software firewall on a node). In another alternate embodiment, the external network may be the public Internet, while the internal network may be encrypted traffic within a Virtual Private Network (VPN) using the Internet as a communication layer.

In one embodiment, the gateway device 108 includes an inbound communication parser 311 coupled to the inbound path 301 to receive and to process the data payloads from the external source node 102 or 104 and further includes an outbound communication parser 312 coupled to the outbound path 302 to receive and to process the data payloads from the internal source node 103. Alternatively, the gateway device 108 may include only one communication parser, which replaces parsers 311 and 312, to receive and to process the data payloads from both the inbound path 301 and the outbound path 302. The communication parsers 311 and 312 process the received data payloads and identify one or more network transmission items within one or more data payloads. In one embodiment, the identified network transmission items are data fields of specified types, for example File Transfer Protocol (FTP) payloads, electronic mail attachments, network file services, or eXtensible Markup Language (XML) documents. In one embodiment, each network transmission item is identified using pattern matching or using one or more of a number of known network communication (e.g. protocol stack) parsing mechanisms.

A "data payload" represents a collection of data identified by the transport protocol (e.g. an XML file). A network transmission data item describes an element of data that may be transmitted by the application either within an application layer protocol or within a defined file format utilized by the application. In some instances the data payload may be identical to the network transmission item (e.g. an HTML file), while in other instances the data payload may contain multiple items (e.g. MIME attachments in an e-mail message). Both data payloads and their constituent items are typically independent of the underlying network technologies and protocols.

For some network technologies, a similar relationship may exist between the unit of transfer at the network layer and the transport layer. For example, in a packet switched network, a single network packet may contain one or more data payloads, or the contents of multiple network data packets may be combined to form a single data payload.

In one embodiment, the gateway device 108 further includes an identifier generator coupled to each communication parser 311 and 312, such as, for example, signature generator 320. The signature generator 320 receives the network transmission items identified by the communication parsers 311, 312 and generates one or more item identifiers corresponding to each network transmission item. The item identifier for the corresponding network transmission item includes a value associated with the network transmission item. In one embodiment, the item identifier includes an item signature of the network transmission item's contents.

In one embodiment, the signature generator uses a cryptographic secure hash algorithm, for example, the SHA1 algorithm, or a message digest algorithm, for example the MD5 algorithm, to generate the item identifier. It is to be understood, however, that other cryptographic algorithms, content-derived or attribute-derived signaturing algorithms (e.g., cyclic redundancy check (CRC) checksums), or compression mechanisms may be used to generate the item identifier. Collectively, herein, these identifier calculation methods are referred to as "content-signaturing" or simply "signaturing" mechanisms and the output of the methods are referred to as a "content signature" or "signature." In addition, it is to be understood that any portions of or any number of the above mentioned generation mechanisms may be combined together, or used separately to generate the respective item identifiers.

In one embodiment, a number of signatures may be combined, through a variety of mechanisms (e.g. concatenation, Boolean bit-wise exclusive-OR'ing, etc.), to form an item identifier. By using one or more content-signaturing mechanisms to generate item identifier values, the item identifier uniquely identifies, for all practical purposes, the contents of a particular network transmission item, not just within that network transmission or network communication, but also across the sample space of all network communications.

In one embodiment, item identifiers are used to establish a partition over the set of network transmission items examined by the gateway device 108 using an identifier-based equivalency relation. For example, two network transmission items are considered to be "equivalent" and belong to the same block of the partition if they have the same item identifier. By definition, partition blocks contain mutually exclusive elements, each partition block is non-empty, and the union of all blocks in a partition is a set of network transmission items examined by the gateway device 108. However, if two network transmission items have identical item identifiers it does not necessarily mean that the network communications or the network transmissions (or other associated metadata) to which they belong or are associated with are the same. In one embodiment, the identifier-based equivalency relation produces the same partitioning of the set of network transmission items examined by the gateway device 108 as does the equivalency relation produced by pair-wise comparing respective network transmission item contents (e.g. bit-wise comparisons). These two partitions can differ if identifier aliasing occurs. Aliasing of item identifiers occurs when two network transmission items with differing contents have an identical item identifier assigned to them. Although technically possible, aliasing is highly unlikely with the choice of a robust content-signaturing mechanism.

To decrease the probability of identifier aliasing, in one embodiment, the item identifier includes a combination of one or more cryptographic hashes, augmented by a content signature generated from a subset of network transmission item contents or metadata associated with the network transmission item. For example, a content signature generated by an MD5 secure hash algorithm may be augmented with network transmission item size information (appropriately formatted by a content-signaturing mechanism) to produce a more robust item identifier, such as an item identifier derived only from the contents (e.g., cryptographic hash of the network transmission item contents) or protocol state or metadata concerning the contents (e.g., content length). As other items of protocol state or other metadata are introduced, system correctness is maintained, but efficiency is reduced, as multiple network transmission items with the same contents but different metadata may no longer be linked.

In order to maximize the amount of traffic that can be allowed without further processing, in one embodiment, network transmission items of certain types may undergo one or more normalizing transformations into a standard, possibly canonical, format prior to calculation of content item identifiers. In this embodiment, content identifiers may be generated based on the normalized representation's contents and metadata. For example, a network transmission item containing a file in a compressed format (e.g. a file compressed using one of many known compression algorithms) may be transformed (i.e. decompressed) so that the content identifier is generated from the expanded contents and expanded size.

In one embodiment, network transmission items of certain types may be transformed to expose a collection of constituent network transmission items contained within a single network transmission item. For example, a network transmission item containing a file in a compressed format may be replaced with metadata and network transmission item contents for the network transmission items that comprise the compressed file. Examples of such compound and/or hierarchical network transmission items or network transmission item collections include, but are not limited to, archives (shell, tar, library, etc), multi-resolution representations of multimedia (e.g. different compression rates for music, video, or still pictures), etc. In one embodiment, the device could use this kind of decomposition to selectively filter and process hierarchical or compound network transmission items.

A content-signaturing mechanism identifier may be associated with a particular content-signaturing mechanism. This versioning information can prevent cross-algorithm aliasing and permit a system to be migrated to an improved item identifier generation mechanism, if desired (e.g., over time, the system may change the mechanism in use). This identifier may be used to facilitate systems where multiple content-signaturing algorithms are in use simultaneously. This identifier may be used as metadata in computing content signatures, implicitly including the identifier in every item identifier generated. Alternatively, as discussed below, the identifier may be stored explicitly and not used explicitly in the computation of item identifiers.

In one embodiment a single, possibly reserved, identifier is used to represent a null network transmission item. Null network transmission items are more likely to be caused by a system failure or any other shortcoming within the network. In such cases, it is more likely that the entire network transmission will be flagged for further logging, processing, and possibly adjustment of the network transmission item recognition/parsing algorithms.

Referring back to FIG. 3, the network gateway device 108 further includes one or more databases coupled to the signature generator 320, such as the signature database 330. The signature database 330 stores each item signature generated by the signature generator 320 and other metadata information. The metadata may be information garnered from the network transmissions, a history of network transmissions, information pointing to related network transmissions (or network transmission items), logging and statistics information, administrative and security policies, etc. Examples of metadata include source and destination host IP addresses, network transmission and network transmission item handles/identifiers (e.g. to find items stored elsewhere), transmission direction and admit (pass) or deny (drop) policy (e.g. deny forwarding of network transmission if a given signature is seen), counts of the number of times a signature is accessed, last update timestamp, access permissions lists, etc.

In one embodiment, the database consists of data stored in the memory units of the gateway device 108. In alternate embodiments, the database may be split between the gateway device 108 and an external unit, or stored entirely in an external database (not shown) and accessed through a connection to a separate device (e.g. an external SQL Server).

The gateway device 108 further includes a filter module 340 directly coupled to the signature generator 320 and the signature database 330 and indirectly coupled to each communication parser 311 and 312. In one embodiment, the filter module 340 determines whether each network transmission item was generated in the external network 100 and can be transmitted to the external destination node, as described in detail below and in connection with FIGS. 4 and 5.

In one embodiment, if a network transmission carries a data payload from an external source node within the external network 100 to an internal destination node within the internal network 106, the communication parser 311 receives the communication stream transmitted by the external source node, for example data packets transmitted by a client 102 or the server 104 within WAN 100. The communication parser 311 processes the data payload, which includes, among others, protocol headers and metadata information, and identifies multiple network transmission items, such as data fields of a specified type, and transmits each network transmission item to the signature generator 320. The signature generator 320 generates one or more item signatures for each network transmission item and stores each item signature in the signature database 330 along with other associated metadata information.

In one embodiment, each item signature is compared to each signature already stored within the signature database 330 to determine if a match already exists. If no match exists, then the item signature is stored within the signature database 330.

In one embodiment, the item signatures within the signature database 330 create a record of the network transmission items generated in the external network 100. Finally, the network transmission items are selectively transmitted to the internal destination node within the internal network, for example to a client 103 within LAN 106. In one embodiment, only the signatures of processed network transmission items are placed in the database, and metadata is discarded.

In an alternate embodiment, if a network communication is initiated between an internal source node and an external destination node, the communication parser 312 receives the network transmission from the internal source node within the internal network, for example data payloads transmitted by a client 103 within LAN 106. The communication parser 312 processes each data payload and identifies multiple network transmission items, such as data fields of a specified type, and transmits each network transmission item to the signature generator 320. The signature generator 320 generates one or more item signature for each network transmission item and transmits each network transmission item and its corresponding item signature to the filter module 340 for a determination of whether the particular item originated from the external network WAN 100.

The filter module 340 accesses the signature database 330 and compares each item signature corresponding to a network transmission item to the already stored signatures. If an item signature matches one or more signatures within the signature database 330, i.e. the corresponding network transmission item was generated (i.e. originated) in the external network, the filter module 340 selectively transmits the network transmission item to the external destination node within the external network. If the item signature does not match at least one of the stored signatures, i.e. the corresponding network transmission item may be internally created data or intellectual property (e.g. code, document, multimedia, etc), the filter module 340 may block the network transmission item immediately, or may transmit the network transmission item to a processing module 350 for further examination, analysis, and action processing, such as, for example, subjecting the data to a pattern-matching test for confidential information not to be released externally. In one embodiment, the processing module 350 performs content analysis to assess the risks of transmission to the external destination node. Alternatively, the processing module 350 may perform any of a number of known security processing tasks to achieve the same result.

For example, by way of illustration, a user transfers an image of a beloved pet from an external network node to an internal network node of a company. The network transmission passes from the external network 100 to the internal network 106 through a network gateway device 108. The incoming network transmission containing the digital image passes through the network gateway device 108, as described in detail above according to one embodiment of the invention.

The image constitutes the data payload of the network transmission. The gateway device 108 relays the network transmission, but also identifies and computes a signature using a cryptographic secure hash algorithm (e.g. SHA1) over the data payload (the network transmission item identified), that is, the digital image. The signature is stored in signature database 330 associated with the gateway device 108 along with information indicating that the data payload originated on an external network node. This information can be determined by examining the source and destination IP addresses, for example, or can be provided by the gateway device 108 based on the port upon which the transmission was received. Possibly, the user later decides to send some image from the internal network node to some external network node, for example a friend's computer. As the image leaves the internal network 106 within a network transmission it must pass through the network gateway device 108. The gateway device 108 buffers the outgoing network transmission and computes a signature using the same cryptographic hash algorithm over the same portions of the data payload (the image). The resulting signature is used to access the database 330. If the database 330 contains the same signature and it indicates that the image originated in the external network 100, the policy implemented on the device is to simply forward the image to the specified destination and no further processing is required and the transaction is not logged because it is innocuous. This would be the case, for instance, if the user had resent the pet image that was known to have originated from the external network 100. If, however, the signature does not match any signatures stored in the database 330, further security processing checks are run. For example, computationally expensive steganographic detection checks may be used to determine if some company secret has been surreptitiously embedded in the image by a malicious individual. Further processing, including logging, alerts, human-intervention, etc, may result in the network transmission being passed on to the external network node, or denied, or detained for further examination. Or, for example, the signature may be present in the database 330, but information may indicate that the payload is company private or licensed material and, as a result, the network transmission is denied. These subsequent procedures are typically dictated by associated policies. The gateway device 108 is able to filter network transmissions to reduce the need for checking all network traffic which incurs costs in terms of network latency, network bandwidth, time space, human labor, log file sizes and monitoring, etc. The gateway device 108 also enables resources to be freed up and for resources to focus on, for example, true security threats, but also serve as a hook for other logging and monitoring purposes. Moreover, for some policies, such as permitting externally-sourced information to be retransmitted by an internal network node to an external network node, all database updates and tracking can be done automatically without human intervention or prior specification.

Figure 4:
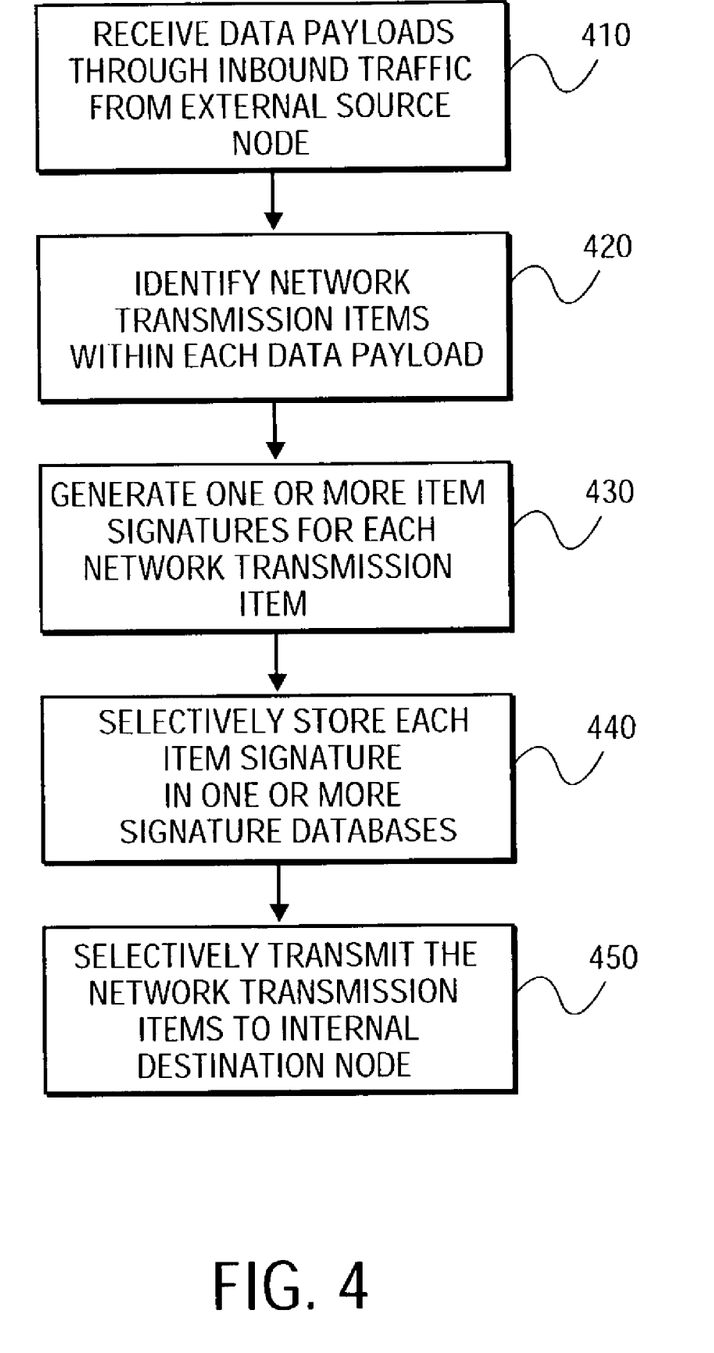
FIG. 4 is a flow diagram of one embodiment of a method to enable efficient processing and transmission of network communications.

FIG. 4 is a flow diagram of one embodiment of a method to enable efficient processing and transmission of network communications. As illustrated in FIG. 4, in one embodiment, at processing block 410, the data payloads are received through inbound traffic from an external source node within an external network.

At processing block 420, network transmission items within each data payload are identified. At processing block 430, one or more item signatures are generated for each identified network transmission item.

At processing block 440, each item signature of a corresponding network transmission item is stored within one or more signature databases. In one embodiment, a comparison is first performed with signatures already stored within the one or more signature databases to determine if a match with the item signature exists. Finally, at processing block 450, the data payloads containing the identified network transmission items are selectively transmitted to an internal destination node within an internal network.

In one embodiment, the method illustrated in connection with FIG. 4 may alternatively be used to handle outbound traffic from an internal node to an external node.

Figure 5:
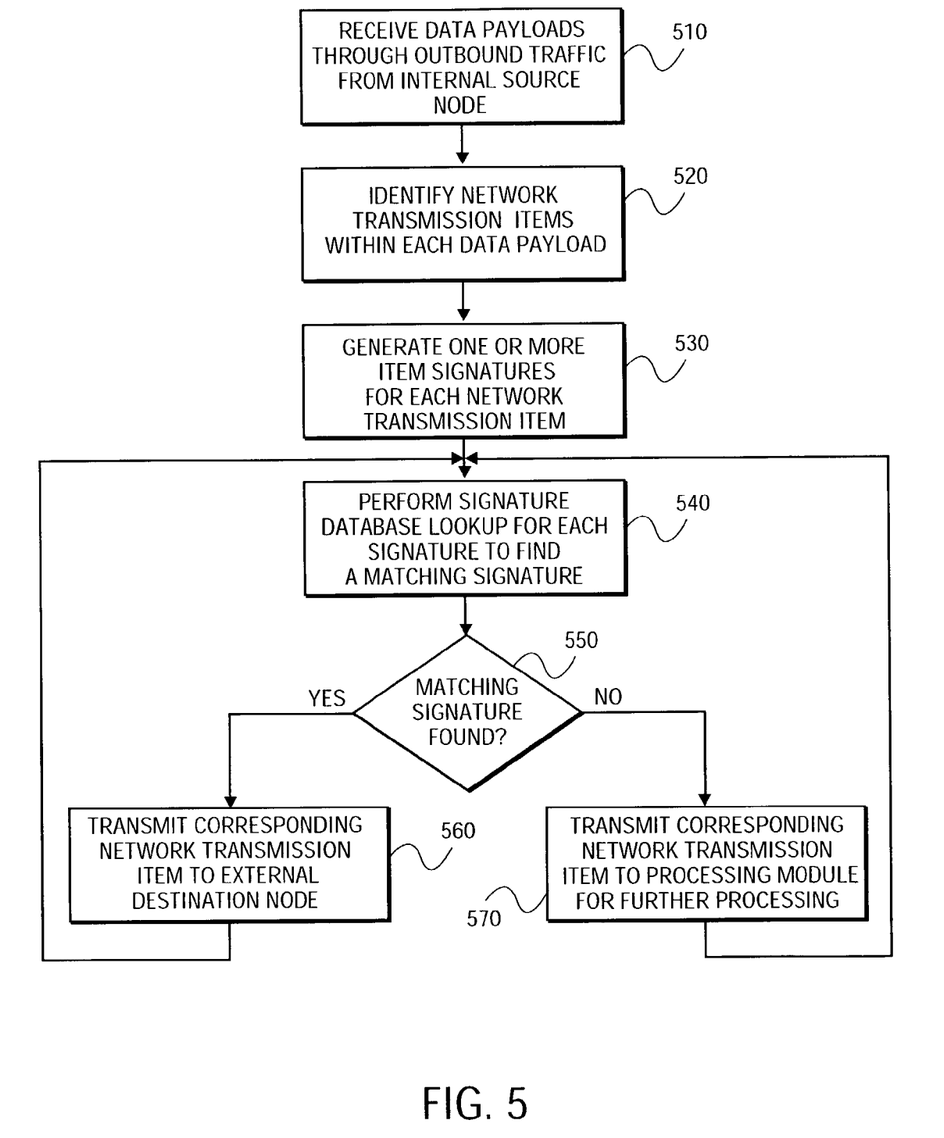
FIG. 5 is a flow diagram of an alternate embodiment of the method to enable efficient processing and transmission of network communications.

FIG. 5 is a flow diagram of an alternate embodiment of the method to enable efficient processing and transmission of network communications. As illustrated in FIG. 5, at processing block 510, data payloads are received through outbound traffic from an internal source node within the internal network.

At processing block 520, network transmission items within each data payload are identified. At processing block 530, one or more item signatures are generated for each identified network transmission item.

At processing block 540, a signature database lookup is performed for each item signature to find one or more matching signatures. At processing block 550, a decision is made whether a matching signature is found for the particular item signature.

If a matching signature is found, at processing block 560, the corresponding network transmission item is transmitted to an external destination node within the external network and blocks 540 and 550 are repeated.

Otherwise, if a matching signature is not found, at processing block 570, the corresponding network transmission item is blocked and is transmitted to a processing module for further processing and blocks 540 and 550 are repeated.

In one embodiment, the method illustrated in connection with FIG. 5 may alternatively be used to handle inbound traffic from an external node to an internal node. For example, filtering of inbound network transmissions, often based on policy, may be performed using the described processing blocks of the method.

In one embodiment of the invention, network transmission items that are not found in the approved signature database are sent to another analysis mechanism for further analysis. Hardware, software, and human analysis may be employed, and items may be permitted based on a human decision, or the result of some additional processing step. In one embodiment, the result of such additional processing is an item signature, which is provided to the signature database in order to permit future traffic of a similar network transmission item.

In one embodiment, an interface may be established for an administrator, or an external service, to provide signature data, such as item signatures and associated metadata information, for network transmission items, which should be approved or prohibited. In one embodiment, items added by such an administrator or external service are permitted to traverse (transmission items are passed/admitted through) the gateway device without any further processing.

In one embodiment, the signature database also includes a set of signatures of items to reject. If a transmission item destined for an internal or external node is received, and the item signature corresponding to the transmission item has a correspondent on the list of items to be rejected (transmission items are dropped), then the network transmission item or the entire transmission may be prohibited. In one embodiment, the item signature and source and destination addresses are stored for future use.

In one embodiment, signatures and metadata such as the source and destination addresses, users, etc. are logged. An interface may be provided to present a network transmission item or corresponding item signature to the gateway device. The gateway device provides data related to any potential traffic involving the network transmission item, such as if and how it entered the internal network, and if and how it has been sent out of the internal network.

In one embodiment, filter conditions may be specified which determine if the contents should be blocked based upon the metadata associated with the signature. For instance an 'allow' rule might indicate that any item which originated on 'Publicserver' should be allowed to pass. Alternatively, a 'deny' rule could be specified that any Adobe® Portable Document Format (PDF) document originating from 'PrivateServer' should not be transmitted.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information. While embodiments of the present invention will be described with reference to the Internet and the World Wide Web, the system and method described herein is equally applicable to other network infrastructures or other data communication systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    receiving, on an outbound path of an internal network, a network transmission directed to a destination node of an external network;
    identifying a network transmission item in the network transmission;
    generating an item signature associated with the network transmission item;
    determining whether the network transmission item originates from the internal network or an external network based at least in part on the item signature;
    transmitting the network transmission item to the destination node if the item originates from an external network; and
    further processing the network transmission item if the item originates from the internal network.

2. The method according to claim 1, wherein determining further comprises:

comparing the item signature to signatures stored in a signature database;
determining that the network transmission item originates from an external network if the item signature matches a signature stored in the signature database; and
determining that the network transmission item originates from the internal network if the item signature does not match a signature stored in the signature database.

3. The method of claim 2, wherein storing a signature in the signature database comprises:
receiving a network transmission on an inbound path of the internal network;
identifying a network transmission item in the network transmission;
generating an item signature associated with the network transmission item; and
storing the item signature in the signature database if no signature for the item exists in the signature database.

4. The method according to claim 1, further comprising:
logging the network transmission item in a log database.

5. The method according to claim 1, wherein the item signature further comprises a cryptographic hash algorithm.

6. The method according to claim 1, wherein further processing the network transmission item comprises:
performing a security inspection on the item; and
determining, based on a security policy, whether to allow transmission of the item to the destination node of the external network.

7. A system comprising:
a memory; and
a processor coupled to the memory to receive, on an outbound path of an internal network, a network transmission directed to a destination node of an external network, to identify a network transmission item in the network transmission, to generate an item signature associated with the network transmission item, to determine whether the network transmission item originates from the internal network or an external network based at least in part on the item signature, to transmit the network transmission item to the destination node if the item originates from an external network, and to further process the network transmission item if the item originates from the internal network.

8. The system according to claim 7, wherein the processor compares the item signature to signatures stored in a signature database within the memory, determines that the network transmission item originates from an external network if the item signature matches a signature in the signature database, and determines that the network transmission item originates from the internal network if the item signature does not match a signature in the signature database.

9. The system according to claim 8, wherein the processor further compares item metadata information associated with the network transmission item to metadata stored in the signature database and corresponding to signatures in the database, and further transmits the network transmission item to the destination node if the metadata does not prohibit transmission of the network transmission item.

10. The system according to claim 8, wherein the processor further compares item metadata information associated with the network transmission item to metadata stored in the signature database and corresponding to signatures in the database, and blocks transmission of the network transmission item to the destination node if the metadata prohibits the transmission.

11. An article of manufacture comprising a machine-accessible medium having content to provide instructions to result in an electronic device performing operations including:
receiving, on an outbound path of an internal network, a network transmission directed to a destination node of an external network;
identifying a network transmission item in the network transmission;
generating an item signature associated with the network transmission item;
determining whether the network transmission item originates from the internal network or an external network based at least in part on the item signature;
transmitting the network transmission item to the destination node if the item originates from an external network; and
further processing the network transmission item if the item originates from the internal network.

12. The article of manufacture of claim 11, the medium having content to provide instructions to result in the electronic device performing further operations including:
comparing the item signature to signatures stored in a signature database;
determining that the network transmission item originates from an external network if the item signature matches a signature stored in the signature database; and
determining that the network transmission item originates from the internal network if the item signature does not match a signature stored in the signature database.

13. The article of manufacture of claim 11, the medium having content to provide instructions to result in the electronic device performing further operations including:
receiving a network transmission on an inbound path of the internal network;
identifying a network transmission item in the network transmission;
generating an item signature associated with the network transmission item; and
storing the item signature in the signature database if no signature for the item exists in the signature database.

14. The article of manufacture of claim 11, the medium having content to provide instructions to result in the electronic device performing further operations including logging the network transmission item in a log database.

15. The article of manufacture of claim 11, wherein the item signature further comprises a cryptographic hash algorithm.

16. The article of manufacture of claim 11, the medium having content to provide instructions to result in the electronic device performing further operations associated with further processing the network transmission item, including:
performing a security inspection on the item; and
determining, based on a security policy, whether to allow transmission of the item to the destination node of the external network.

* * * * *